Oct. 5, 1971  R. H. WENTORF, JR  3,609,818
REACTION VESSEL FOR HIGH PRESSURE APPARATUS
Filed Jan. 2, 1970
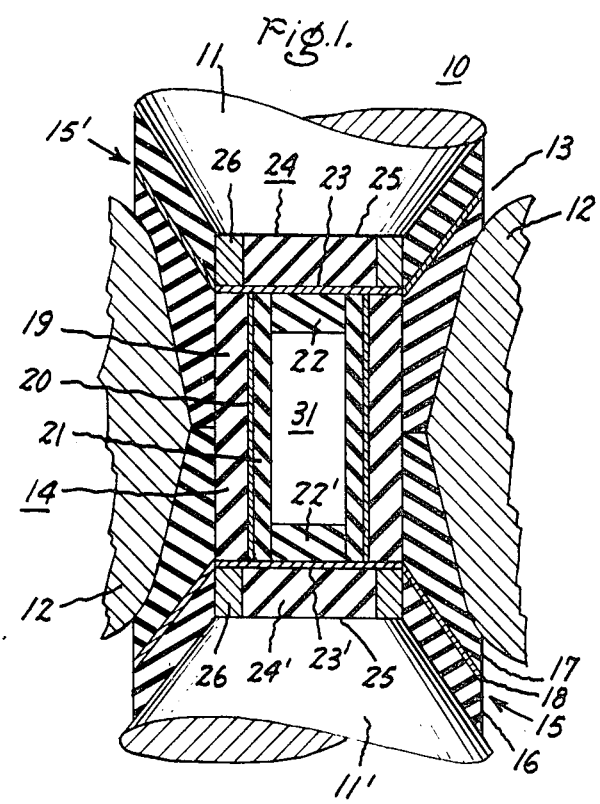
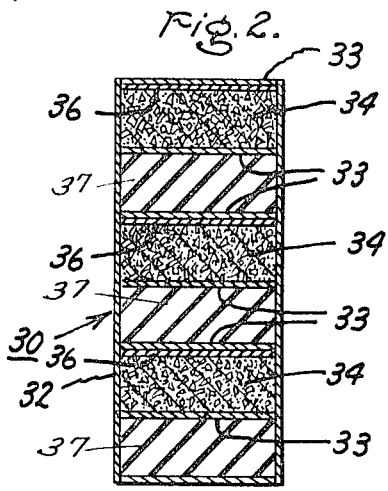
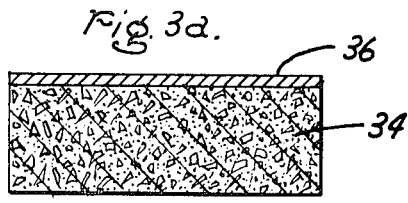
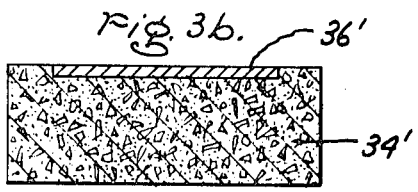
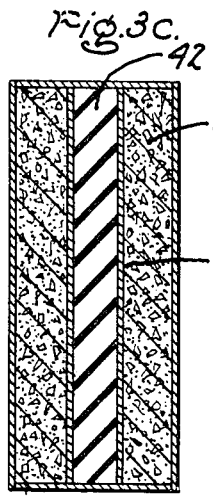
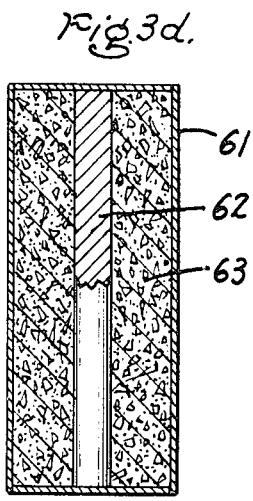
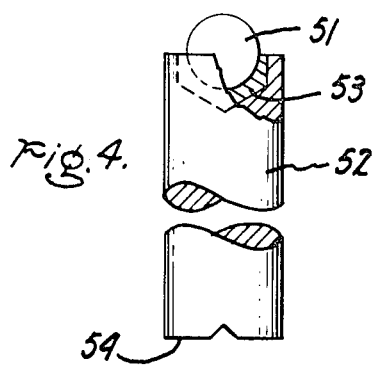
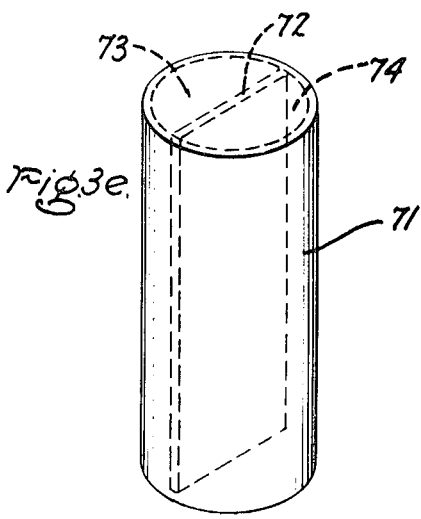
Inventor:
Robert H. Wentorf Jr.,
by
His Attorney.

United States Patent Office 3,609,818
Patented Oct. 5, 1971

3,609,818
REACTION VESSEL FOR HIGH PRESSURE APPARATUS
Robert H. Wentorf, Jr., Schenectady, N.Y., assignor to General Electric Company
Filed Jan. 2, 1970, Ser. No. 144
Int. Cl. B29c 1/00; B30b 11/32
U.S. Cl. 18—34 R
4 Claims

ABSTRACT OF THE DISCLOSURE

An improved reaction vessel construction for the compaction of a mass of dense, strong particles e.g. diamond is disclosed. This improved construction embodies a mechanically unstable structural system to prevent the formation of pressure-supporting geometries within or encircling the mass.

BACKGROUND OF THE INVENTION

A variety of configurations have been disclosed in the art for the production of high pressure materials employing a catalyst system (e.g. diamond). Such constructions are disclosed in U.S. Pats. 2,992,900—Bovenkerk; 3,031,269—Bovenkerk; 3,141,746—De Lai; 3,317,035—Cannon; 3,136,615—Bovenkerk et al.; 3,233,988—Wentorf, Jr. et al.; 3,306,720—Darrow; 3,356,473—Hull et al. and 3,407,445—Strong, for example.

Of the aforementioned patents the De Lai patent, the Strong patent and the Hull et al. patent all disclose arrangements for the preparation of polycrystalline diamond masses generally referred to as "compacts." Both the Bovenkerk et al. patent and the Wentorf, Jr. et al. patent disclose the preparation of cubic boron nitride compacts. Although the starting materials differ, both De Lai and Strong employ protective sheath materials for the reactant mass and both make reference to the desirability of controlling impurities in the reaction volume. De Lai prepares diamond compacts from diamond fines in the presence of diamond reaction catalyst metals. Strong converts graphite to a polycrystalline mass (in a preformed shape, if desired) in the presence of a similar catalyst metal.

The De Lai patent describes the preparation of a diamond compact in which the major portion (by volume) is diamond. None of the patents, however appears to consider the problem that occurs in the preparation of compacts when a very dense strong mass (e.g. diamond crystals) is to be infused with a molten catalyst metal. The process of consolidation of the mass may be interrupted by any of the following phenomena:

(a) saturation of the entire reaction mass with the liquid metal catalyst (as in the case of diamond or cubic boron nitride, for example) or solvent (as in the case of silicon carbide, for example, in the presence of iron);
(b) blocking of the pores between particles of the reaction mass by consolidation of the particles so as to cut off the flow of liquid metal catalyst therethrough;
(c) the formation of mechanically stable geometries (arches, bridges, spheres, shells, etc.) around or within the consolidated reaction mass (or even within the unreacted mass) that shield portions of the interior of the reaction mass from the full applied pressure whereby completion of the conversion desired does not occur.

Apparently those skilled in the high pressure, high temperature art have accepted these limitations or have been unable to offer a solution to minimize or, at least, reduce this problem. Such a solution would make possible the preparation of stronger, thicker compact discs for use as, or mounted in, abrading tools.

It is therefore highly desirable that a solution be offered to obviate or offset the effects of one or more of the above-noted phenomena, which limit the capabilities for compact growth.

SUMMARY OF THE INVENTION

The instant invention provides an improved reaction vessel construction capable of overcoming to a substantial degree interruption in the advance of the compaction front through a dense, strong medium to be consolidated and/or converted by high pressure, high temperature processes.

The essential aspect of the instant invention is the provision for a mechanically unstable structural system enclosing and within the charge element of a high pressure (high temperature) vessel. The construction of this invention is preferably employed for the conduct of processes in which (a) very rigid, strong particles are to be compacted in the presence of a catalyst (or in some instances a solvent) system and
(b) zones exist or are created in the mass in which large (greater than 5%) decreases in volume occur during the consolidation process.

Appropriate mechanical instability provides that the strength of the consolidated portions will be overcome and the consolidation front will continue to advance beyond the limits ordinarily achieved with a mechanically stable system.

BRIEF DESCRIPTION OF THE DRAWINGS

This invention will be better understood from the following description and drawings in which:

FIG. 1 illustrates one exemplary high pressure, high temperature apparatus;

FIG. 2 illustrates a preferred charge assembly configuration for use in the practice of the instant invention;

FIGS. 3a, b, c, d and e illustrate various component arrangements of the mechanically unstable catalyst metal (or in some instances solvent metal), the mass to be compacted and/or converted, and the deformable, quasi-hydrostatic pressure-transmitting material, and FIG. 4 illustrates a diamond tool presenting a diamond compact prepared according to this invention for use in such abrading tasks as to true up or dress an abrading wheel.

DESCRIPTION OF THE PREFERRED EMBODIMENT

One preferred form of a high pressure, high temperature apparatus in which the charge assembly of the instant invention may be employed is the subject of U.S. Patent 2,941,248—Hall (incorporated by reference) and is briefly described in FIG. 1.

In FIG. 1, apparatus 10 includes a pair of cemented tungsten carbide punches 11 and 11' and an intermediate belt or die member 12 of the same material. Die member 12 includes an aperture 13 in which there is positioned a reaction vessel 14. Between punch 11 and die 12 and between punch 11' and die 12 there are included gasket/insulating assemblies 15, 15', each comprising a pair of thermally insulating and electrically non-conducting pyrophyllite members 16 and 17 and an intermediate metallic gasket 18.

Reaction vessel 14 in one preferred form, includes a hollow salt cylinder 19. Cylinder 19 maybe of other materials, such as talc or other material, which (a) is not converted to a stronger and stiffer state as by phase transformation and or compaction and (b) is substantially free of volume discontinuities occurring under the application of high temperatures and pressures, as occurs, for example, with pyrophyllite and porous alumina. Materials meeting the criteria set forth in U.S. 3,030,662 (column 1, lines 59 through column 2, line 2, incorporated by reference) are useful for preparing cylinder 19. Positioned concentrically within and adjacent cylinder 19 is a graphite electrical resistance heater tube 20. Within graphite heater tube 20 there is in turn concentrically positioned the cylindrical salt liner 21. The opposite ends of liner 21 are fitted with salt plugs 22, 22', disposed above and below, respectively, the charge assembly (not shown in FIG. 1) to be described hereinbelow. Electrically conductive metal end discs 23 and 23' are utilized at each end of cylinder 19 to provide electrical connection to graphite heater tube 20. Adjacent each disc 23, 23' is an end cap assembly 24 and 24' each comprising a pyrophyllite plug or disc 25 surrounded by an electrical conducting ring 26.

Operational techniques for applying both high pressures and high temperatures in this apparatus are well known to those skilled in the art. The foregoing description relates to merely one high pressure, high temperature apparatus. Various other apparatuses are capable of providing the required pressures and temperatures that may be employed within the scope of this invention.

This invention will be specifically described in connection with the preparation of diamond compacts, however, this is merely an exemplary usage.

One preferred example of the mechanically unstable charge assembly construction of this invention is shown in FIG. 2. Charge assembly 30, although not illustrated in proportion, fits within space 31 of the apparatus of FIG. 1.

Charge assembly 30 consists of cylindrical sleeve 32 of shield metal selected from the group consisting of zirconium, titanium, tantalum, tungsten and molybdenum. Within cylindrical sleeve 32 are disposed a number of sub-assemblies protected above and below by shielding discs 33 made of metal selected from the above-mentioned group. Each sub-assembly so protected on all sides consist of a mass 34 largely or completely made up of diamond powder (in the size range from about 0.1 micrometer to 500 micrometers in largest dimension) and disc 36 of catalyst metal concentrated on one side only of each mass 34. Catalyst metals for the conversion of graphite (or other carbon source) to diamond have been reported in many of the patents referred to hereinabove and are, therefore, well known. The mass 34 may contain minor quantities of graphite powder in addition to the diamond.

Because of the fact that each mass 34 is very dense and strong due to the high diamond content thereof, the surface regions of each mass 34 would, in the absence of mechanical instability, be capable of forming various geometric shapes, e.g. arches, bridges, shells, etc. which would actually prevent transmission of the true applied pressure to the interior of masses 34. In such an instance, the pressure in the shielded interior of each mass 34 falls to that of the diamond-graphite equilibrium and no further diamond growth of any kind occurs.

Even with a mass completely composed of diamond crystals the capability of diamond growth is still required in order to reconvert to diamond (a) such graphite as is formed during the conduct of the consolidation process and (b) such diamond as may dissolve in the catalyst-solvent metal in regions of high free energy and regions of higher temperature.

The number of competing phenomena is large and the compaction mechanisms are complex. However, it is definitely known that merely introducing a condition of mechanical instabillity whether intentionally or inadvertently within charge assembly 30 is not sufficient to achieve the benefits sought. It is also necessary to the full utilization of such a structure to properly select the materials of which all elements are made that (a) are located in the "hot" zone and (b) transmit pressure to the charge element. The volume enclosed by the gasket/insulating assemblies 15, 15' is considered the "hot" zone and the elements enclosed therein (in addition to charge assembly 30) in the construction shown are cylinder 19, heater tube 20 and liner 21. Cylinder 19 is relatively massive compared to components 20 and 21 and it must be recognized that selection of the material of which this element is made is of prime importance in the practice of this invention. Thus, materials that increase in strength and stiffness under the high temperature conditions required for the compaction process should not be used. Pyrophyllite, catlinite and $Al_2O_3$, for example, are not suitable, while NaCl or talc work well. When the former materials are employed (even though the charge assembly be mechanically unstable) and the compaction temperatures are high enough, cylinder 19 after initial reduction in height stiffness and, together with the cell elements above and below it, acts as a mechanically stable hollow structure shielding the volume therewithin (including the charge assemby 30) from the pressure application. This action, of course, is to be avoided in the practice of the instant invention as the benefits of mechanically unstable structuring of the charge assembly would, in large part, be nullified.

It has been found that while in the past (in a reaction cell about ¾" in diameter and about 1" in height) it has been difficult to transmit diamond-growing pressures through more than about a one millimeter thickness of consolidated hot material, this distance can be at least doubled (in the same reaction cell size) with the mechanically unstable disposition of elements shown in FIG. 2. Thus, as pressure is applied to the charge assembly 30 and the mixture is heated, melting of the catalyst discs 36 occurs and the catalyst metal is displaced from its initial location into available voids and cracks between diamond particles in each mass 34. Such graphite as may be present from the start or is generated by conversion of diamond to graphite by various mechanisms becomes converted to diamond in those regions favorable to diamond growth. Local contraction occurs at these locations due both to the conversion of graphite to diamond (diamond being a more dense material) and to a reduction in voids, because of the dissolution of diamond in the catalyst-solvent and transport thereof to these regions favorable to diamond growth, where diamond reforms occupying former voids to produce a much stronger compact. Simultaneously cracking occurs along the compaction front of the consolidating mass because of this contraction (greater than 5% decrease in volume) such that the mass loses the structural integrity which otherwise would enable it to prevent the transmission of the pressures to portions of the mass shielded thereby.'

This phenomenon of mechanical instability is very pronounced in mixtures of diamond and graphite. As the catalyst metal is forced into the reaction mass the surrounding pressure distribution material (the salt discs 37) above each sub-assembly moves in to occupy the volume previously occupied by the displaced catalyst metal.

Another advantage of this construction is the aid to mobilizing and displacing by the molten catalyst metal of such impurities as may exist in the system. These impurities are forced along by molten catalyst metal at the advancing compaction front and therefore are not present to interfere with the integrity of the diamond-to-diamond bonding occurring between adjacent particles.

The sub-assembly of FIG. 2 is shown in FIG. 3a and FIG. 3b displays an operative modification thereof. The components of FIG. 3b are shown as 34' (mass to be consolidated, predominantly diamond) and 36' (the catalyst metal disc).

The embodiment of FIG. 3c is similar in principle to that of the sub-assemblies discussed heretofore, except that the principle has been applied employing radially disposed components e.g. catalyst metal cylinder 41, cylinder 42 of pressure transmitting (and catalyst displacing) material and annular mass 43 of strong dense material to be compacted.

The embodiments shown in FIGS. 3c, 3d and 3e are charge assemblies analogous to FIG. 2. The constructions shown in FIGS. 3d and 3e differ from the construction shown in FIG. 3c in that the displacing pressure-transmitting material is not located within the protective metal sheaths 61, 71. However, as the catalyst metal is displaced, the pressure-transmitting material, e.g. salt distends (or breaks) the metal shields 61, 71 to take the place of the catalyst metal in core 62 or sheet 72, which move into the adjacent masses 63, 73, 74.

Example 1

Three parts by weight of −400 mesh diamond powder was mixed with one part by weight of very pure graphite powder and pressed into small discs about 0.250 inch in diameter and 0.070 inch in thickness. Four such discs together with 0.005 inch catalyst metal discs were assembled as shown in FIG. 2 together with separating plugs of salt and 0.002 inch discs of zirconium within a zirconium metal sleeve having a wall thickness of about 0.002 inch. The catalyst discs were of Fernico (54% iron, 28% nickel, 18% cobalt). This charge assembly was introduced into a salt sample holder of the configuration displayed in FIG. 1.

The zirconconium discs 33 help to keep the adjacent catalyst disc and carbon clean. The salt plugs in addition to helping transmit pressure also permit easy separation of the compact discs produced.

The sample was subjected to a pressure of about 55 kilobars and heated at a temperature of about 1000° C. for about 25 minutes. The temperature was then raised to about 1500° C. and held for about 4 hours. Finally the sample was rapidly cooled, pressure was reduced and the sample was removed from the press.

After dissolving the salt away with water, the diamond discs were separated from each other. The topmost disc of the four was cleaned and then brazed into a pocket in the end of a ⅜ inch square steel rod using a hard solder (Cu-Ag-Cd-Zn etc.) employing a hydrogen flame at dull red heat. The construction of the tool produced is shown in FIG. 4 (diamond compact 51, steel rod 52 and solder 53). The far end of rod 52 was formed flat in order that this could serve as a reference base during testing of the abrasive resistance of a compact.

The thin skin of zirconium remaining on the exposed portion of the disc 51 was ground off and then the distance between the reference base 54 and the tip edge of the disc 51 was measured and found to be 1.5762 inches. The diamond compact disc mounted in this holder was then used as a dressing wheel to remove material from a standard reference $Al_2O_3$ wheel. A water-oil emulsion coolant was employed to bathe the work zone. For most of the task the down-feed was 0.002 inch per pass and the wheel axis was parallel with the axis of the diamond disc.

After about 5.1 cubic inches of the wheel had been removed (corresponding to a total down-feed of 0.600 inch) the wheel diameter had shrunk from 5.994 inch to 4.799 inch indicating a change in diamond disc height of 0.0025 inch. The distance from the reference base to the tip of the diamond compact had decreased to 1.5739 inch indicating a change of 0.0023 inch. It was determined that the mass loss of diamond from the compact was about 0.21 mg. providing a grinding ratio of about $$\frac{5.1 \times 1000}{0.21} = 24,000 \text{ cubic inches per gram}$$

a value comparable to that obtained for natural single crystal diamond in related, but not identical tests.

Example 2

A mixture of −325 mesh diamond and graphite powders (133 mg. diamond/67 mg. graphite) was pressed in discs much as described in Example 1 but with a recess in one face occupied by a disc of 90 Fe 10 Al alloy (about 0.187″ in diameter and 0.007″ thick) weighing 52 mg. The sub-assembly was of the general type illustrated in FIG. 3b except that the diamond/graphite/catalyst disc combination was completely enclosed in a zirconium metal (0.002″ thick walls) can disposed in a zirconium metal sleeve (0.001″ thick wall).

The sample was subjected to a pressure of about 55 kilobars and heated to about 1600° C. in a period of 7.5 minutes and held at 1600° C. for 15 minutes. The temperature was then dropped to 25° C. in 3 minutes and the pressure was then released. The compact "pill" was washed free of salt and then split into two approximately equal half-cylinders by striking the compact a heavy blow in the center of the top face thereof with the bottom face spanning a notch in a steel block. The break was clean and fairly smooth with crystals parting across the plane of stress rather than being pulled out of one or the other half. The overall diamond content of the compact was determined to be 92.3%.

A grinding ratio test similar to that used in Example 1 was performed, except that a silicon carbide wheel was used, which had 10 times the abrasive resistance of aluminum oxide. The grinding ratio against the silicon carbide wheel was 4500 cubic inch per gram, a value comparable to the results obtained with natural single crystal diamonds with silicon carbide wheels.

It is important that the quantity of liquid metal (catalyst or solvent) present be less than that quantity, which would hydrostatically bathe the particles being compacted. In the case of diamond compacts it is preferable to have from about 5 to about 10% by volume of the compacted mass be catalyst metal. The term "catalyst metal" as used in the following claims is intended to include both those metals functioning as catalysts and those functioning as solvents.

What I claim as new and desire to secure by Letters Patent of the United States is:

1. In a reaction vessel to be introduced into a high pressure, high temperature apparatus, wherein said reaction vessel comprises an assembly of interfitting inner and outer elements surrounding at least one protective metal enclosure containing catalyst metal therein and in addition being adapted to contain rigid strong crystalline material for the preparation of compacts therefrom, the outer element of said reaction vessel being a hollow wall of electrically nonconductive, thermally insulating material and means being located adjacent said outer element for conducting electrical current into and out of said reaction vessel, the improvement comprising,
    (a) said outer element being made of deformable pressure-transmitting material remaining substantially free of volume discontinuities and phase transitions under the application of heat and pressure thereto, and
    (b) a single concentration of said catalyst metal is located within each protective metal enclosure in contact therewith.

2. The improvement as recited in claim 1 wherein the concentration of said catalyst metal is in the form of a single disc contiguous with one wall of the protective metal enclosure.

3. The improvement as recited in claim 1 wherein the concentration of said catalyst metal is in the form of a single hollow cylinder enclosing a core of the deformable pressure-transmitting material.

4. The improvement as recited in claim 1 wherein the concentration of said catalyst metal is in the form of a centrally-located solid cylinder.

(References on following page)

References Cited

UNITED STATES PATENTS

| | | | |
|---|---|---|---|
| 2,941,250 | 6/1960 | Hall | 18—Hi Pres Dig |
| 2,944,289 | 7/1960 | Hall | 18—Hi Pres Dig |
| 2,992,900 | 7/1961 | Bovenkerk | 18—Hi Pres Dig |
| 3,030,661 | 4/1962 | Strong | 18—Hi Pres Dig |
| 3,030,662 | 4/1962 | Strong | 18—Hi Pres Dig |
| 3,031,269 | 4/1962 | Bovenkerk | 18—Hi Pres Dig |
| 3,082,477 | 3/1963 | Custers et al. | 18—Hi Pres Dig |
| 3,407,445 | 10/1968 | Strong | 18—Hi Pres Dig |

J. HOWARD FLINT, JR., Primary Examiner

U.S. Cl. X.R.

18—16 Hi Pres Dig